(12) United States Patent
Dong et al.

(10) Patent No.: US 6,989,962 B1
(45) Date of Patent: Jan. 24, 2006

(54) INDUCTIVE WRITE HEAD HAVING HIGH MAGNETIC MOMENT POLES AND LOW MAGNETIC MOMENT THIN LAYER IN THE BACK GAP, AND METHODS FOR MAKING

(75) Inventors: Zi-Wen Dong, Union City, CA (US); James Wong, Milpitas, CA (US); Ron Barr, Mountain View, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/373,564

(22) Filed: Feb. 24, 2003

Related U.S. Application Data

(63) Continuation of application No. 09/670,413, filed on Sep. 26, 2000, now abandoned.

(51) Int. Cl.
*G11B 5/127* (2006.01)
(52) U.S. Cl. .................................................. 360/126
(58) Field of Classification Search ............... 360/126, 360/317
See application file for complete search history.

(56) References Cited

U.S. PATENT DOCUMENTS

| 5,198,949 A | * | 3/1993 | Narisawa et al. ........... 360/126 |
| 5,385,637 A | | 1/1995 | Thayamballi ............... 156/656 |
| 5,388,019 A | | 2/1995 | Argyle et al. ............... 360/126 |
| 5,390,062 A | | 2/1995 | Matsuzawa et al. ........ 360/126 |
| 5,590,008 A | | 12/1996 | Tanabe et al. .............. 360/126 |
| 5,600,519 A | * | 2/1997 | Heim et al. ................. 360/126 |
| 5,606,478 A | | 2/1997 | Chen et al. ................. 360/126 |
| 5,621,596 A | | 4/1997 | Santini ....................... 360/126 |
| 5,663,006 A | | 9/1997 | Nakamura et al. ...... 428/694 R |
| 5,687,045 A | | 11/1997 | Okai et al. .................. 360/126 |
| 5,729,409 A | | 3/1998 | Ohashi et al. ............. 428/65.3 |
| 5,737,825 A | | 4/1998 | Gray et al. ............... 29/603.14 |
| 5,748,417 A | | 5/1998 | Malhotra et al. ........... 360/126 |
| 5,805,392 A | | 9/1998 | Mallary et al. ............. 360/126 |
| 5,812,350 A | | 9/1998 | Chen et al. ................. 360/126 |
| 5,822,159 A | | 10/1998 | Fukuyama et al. ......... 360/318 |
| 5,850,325 A | | 12/1998 | Miyauchi et al. ........... 360/126 |
| 5,864,450 A | | 1/1999 | Chen et al. ................. 360/317 |

(Continued)

FOREIGN PATENT DOCUMENTS

JP 5-290329 A * 11/1993

(Continued)

*Primary Examiner*—Jefferson Evans
(74) *Attorney, Agent, or Firm*—Joshua C. Harrison, Esq.; Haynes Beffel & Wolfeld

(57) ABSTRACT

The present invention provides a write element for use in magnetic data recording system such as a computer disk drive. The write head utilizes the advantageous properties of high magnetic moments while overcoming the corrosion problems engendered by such materials. The write element includes a magnetic yoke constructed of first and second magnetic poles joined to one another at a back gap. While the majority of the poles are constructed of a high magnetic moment material a layer of relatively low magnetic moment material is provided on the first pole at the back gap portion of the first pole. The relatively low magnetic moment material prevents corrosion of the first pole during subsequent manufacturing of the write head. An electrically conductive coil passes through the magnetic yoke and is insulated there from. By passing an electrical current through the electrical coil, a magnetic flux is generated in the yoke. This magnetic flux then generates a magnetic fringing field in at a write gap of the yoke. The fringing field imparts magnetic data onto a recording medium passing thereby.

18 Claims, 6 Drawing Sheets

U.S. PATENT DOCUMENTS

| | | | |
|---|---|---|---|
| 5,905,611 A | 5/1999 | Yoda et al. | 360/324.11 |
| 5,949,627 A | 9/1999 | Williams et al. | 360/126 |
| 6,007,643 A | 12/1999 | Kishi et al. | 29/603.08 |
| 6,018,862 A * | 2/2000 | Stageberg et al. | 29/603.14 |
| 6,317,290 B1 * | 11/2001 | Wang et al. | 360/126 |
| 6,542,331 B1 * | 4/2003 | Chang et al. | 360/126 |
| 2004/0012884 A1 * | 1/2004 | Sato et al. | 360/126 |
| 2004/0179296 A1 * | 9/2004 | Sato | 360/126 |

FOREIGN PATENT DOCUMENTS

JP    6-84132 A  *  3/1994

* cited by examiner

INDUCTIVE WRITE HEAD HAVING HIGH MAGNETIC MOMENT POLES AND LOW MAGNETIC MOMENT THIN LAYER IN THE BACK GAP, AND METHODS FOR MAKING

RELATED APPLICATIONS

This application is a continuation of application Ser. No. 09/670, 413 filed 26 Sep. 2000, now abandoned.

FIELD OF THE INVENTION

The present invention relates to inductive write heads for use in magnetic data storage devices and more particularly to a method for manufacturing a write element having high magnetic moment poles.

BACKGROUND OF THE INVENTION

Magnetic disk drives are used to store and retrieve data for digital electronic apparatus such as computers. In FIGS. 1A and 1B, a magnetic disk data storage system 10 of the prior art includes a sealed enclosure 12, a disk drive motor 14, one or more magnetic disks 16, supported for rotation by a drive spindle 18 of motor 14, and an actuator 20 including at least one arm 22, the actuator being attached to a pivot bearing 24. Suspensions 26 are coupled to the ends of the arms 22, and each suspension supports at its distal end a read/write head or transducer 28. The head 28 (which will be described in greater detail with reference to FIGS. 2A and 2B) typically includes a write element with a sensor read element. As the motor 14 rotates the magnetic disk 16, as indicated by the arrow R, an air bearing is formed under the transducer 28 causing it to lift slightly off the surface of the magnetic disk 16, or, as it is termed in the art, to "fly" above the magnetic disk 16. Alternatively, some transducers, known as contact heads, ride on the disk surface. Various magnetic "tracks" of information can be written to and/or read from the magnetic disk 16 as the actuator 20 causes the transducer 28 to pivot in a short arc across a surface of the disk 16. The pivotal position of the actuator 20 is controlled by a voice coil 30, which passes between a set of magnets (not shown) to be driven by magnetic forces caused by current flowing through the coil 30.

FIG. 2A shows the distal end of the head 28, greatly enlarged so that a write element 32 incorporated into the head can be seen. The write element 32 includes a magnetic yoke 34 having an electrically conductive coil 36 passing therethrough.

The write element 32 can be better understood with reference to FIG. 2B, which shows the write element 32 and an integral read element 38 in cross section. The head 28 includes a substrate 40 above which the read element 38 and the write element 32 are disposed. A common edge of the read and write elements 38, 32, defines an air bearing surface (ABS), in a plane 42, which can be aligned to face the surface of the magnetic disk 16 (see FIGS. 1A and 1B). The read element 38 includes a first shield 44, a second shield 46, and a read sensor 48 that is located within a dielectric medium 50 between the first shield 44 and the second shield 46. The most common type of read sensor 48 used in the read/write head 28 is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element 32 is typically an inductive write element that includes the second shield 46 (which functions as a first pole for the write element) and a second pole 52 disposed above the first pole 46. Since the present invention focuses on the write element 32, the second shield/first pole 46 will hereafter be referred to as the "first pole". The first pole 46 and the second pole 52 contact one another at a backgap portion 54, with these three elements collectively forming the yoke 34. The combination of a first pole tip portion and a second pole tip portion near the ABS are sometimes referred to as the yoke tip portion 56. Some write elements have included a pedestal 55 which can be used to help define track width and throat height. A write gap 58 is formed between the first and second poles 46 and 52 in the yoke tip portion 56. The write gap 58 is filled with a non-magnetic, electrically insulating material that forms a write gap material layer 60. This non-magnetic material can be either integral with or separate from a first insulation layer 62 that lies upon the first pole 46 and extends from the yoke tip portion 56 to the backgap portion 54. The conductive coil 36, shown in cross section, passes through the yoke 34, sitting upon the write gap material 60. A second insulation layer 64 covers the coil and electrically insulates it from the second pole 52.

An inductive write head such as that shown in FIGS. 2A and 2B operates by passing a writing current through the conductive coil 36. Because of the magnetic properties of the yoke 34, a magnetic flux is induced in the first and second poles 46 and 52 by write currents passed through the coil 36. The write gap 58 allows the magnetic flux to fringe out from the yoke 34 (thus forming a fringing gap field) and to cross the magnetic recording medium that is placed near the ABS.

In order to increase data density it becomes necessary to decrease the size of the read and write elements 38, 32 of the head 28. By making the read and write elements 38, 32 smaller, the track width can be reduced and accordingly more tracks of data can be fit onto the disk 16. However, while decreasing the size of the head 28 the strength of the magnetic fringing field produced by the write element 32 must be maintained. One way of increasing the strength of the fringing field produced by a write element 32 is to use a high magnetic moment material in construction of the yoke 34. However, use of such high magnetic moment material presents certain challenges. For example, such high magnetic moment materials are highly corrosive. This problem is compounded by the high temperatures required to cure the coil insulation layer 64 and by the wet processes required for wafer fabrication. Such high temperatures cause any portion of high magnetic moment material exposed to atmosphere to quickly corrode. Wet chemicals may react with high magnetic moment material and cause corrosion. Prior art head manufacturing techniques require leaving the back gap portion 54 of the first pole 46 exposed to atmosphere so that the second pole 52 can be plated to connect with the first pole in the back gap 54.

Therefore, there remains a need for a method for constructing an inductive write element that makes use of the advantageous magnetic properties of high magnetic moment materials while mitigating the corrosion problems associated with such materials. Such a method would preferably be cost effective, requiring a minimum number of additional manufacturing steps and utilizing currently available wafer fabrication processes.

SUMMARY OF THE INVENTION

The present invention provides an inductive write head for use in a magnetic data storage system such as a computer disk drive and also provides a method for manufacturing such a write element. The head includes a first pole, constructed primarily of a high magnetic moment material and having an end defining a back gap and an opposite end defining a pole tip. The first pole also has a lower magnetic moment material forming a capping layer at the back gap. A second magnetic pole is formed over the first pole and is joined to the first pole at the back gap, the first and second poles together forming a magnetic yoke. The magnetic yoke has an open interior through which passes an electrically conductive coil and has a write gap at its end opposite the back gap. A layer of dielectric material provides electrical separation between the poles in the write gap and provides separation between the coil and the first pole. A second insulation layer separates the coil from the second pole and also separates the winds of the coil from one another.

In addition to the first pole, the second pole can also be constructed of a high magnetic moment material, so that essentially the whole yoke is constructed of a high magnetic moment material. The relatively low magnetic moment capping layer can be formed of permalloy and advantageously prevents corrosion of the back gap of the first pole during fabrication of the rest of the write element. Although the capping layer is not constructed of a high magnetic moment material, it is sufficiently thin that it has a negligible effect on the magnetic performance of the write element. The capping layer is preferably on the order of 1000 Angstroms thick, but can range from 1000–3000 Angstroms in thickness, depending on the size of the back-gap. While the thickness of the capping layer can be varied it is preferably no more than 1 um thick.

The dielectric layer can provide both a write gap layer as well as providing insulation between the coil and the first pole. Alternatively, an additional dielectric layer can be provided, below the write gap material layer to provide additional insulation between the coil and the first pole.

A method for manufacturing such a write head includes first forming the first pole. The first pole is constructed of a high magnetic moment material, and the deposition process used to form the pole depends on the material chosen. For example high Fe content alloys such as $NiFe_{55}$ can be plated whereas other high magnetic moment materials must be sputter deposited. Then, a photoresist material is spun and masked onto the first pole. The photoresist is then lifted off to expose the back gap, as well as a set of read element probing pads. Then a layer of permalloy is plated or sputtered onto the back gap. After that a magnetic coil is formed, preferably of copper, according to plating methods familiar to those skilled in the art. Another layer of photoresist is deposited and is cured using high temperatures to form smoothly rounded edges. The second pole is then plated so as to contact the thin layer of permalloy in the back gap portion of the first pole. Plating the back gap of the first pole with a thin layer of permalloy, advantageously prevents corrosion in the back gap which would otherwise occur due to the later wafer processes such as the high temperature cure of the second insulation layer, chemical etching, etc.

These and other advantages of the present invention will become apparent to those skilled in the art upon a reading of the following descriptions of the invention and a study of the several figures of the drawings.

BRIEF DESCRIPTION OF THE FIGURES

The present invention will be readily understood by the following detailed description in conjunction with the accompanying drawings, with like reference numerals designating like elements.

DETAILED DESCRIPTION OF THE PREFERRED EMBODIMENTS

Figure 1A:
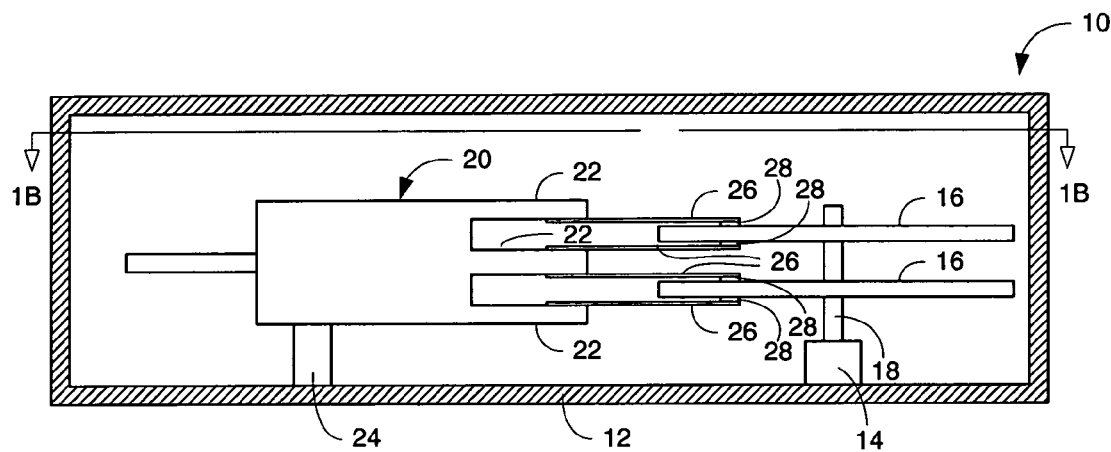
FIG. 1A is a partial cross-sectional front elevation view of a magnetic data storage system of the background art.
Figure 1B:
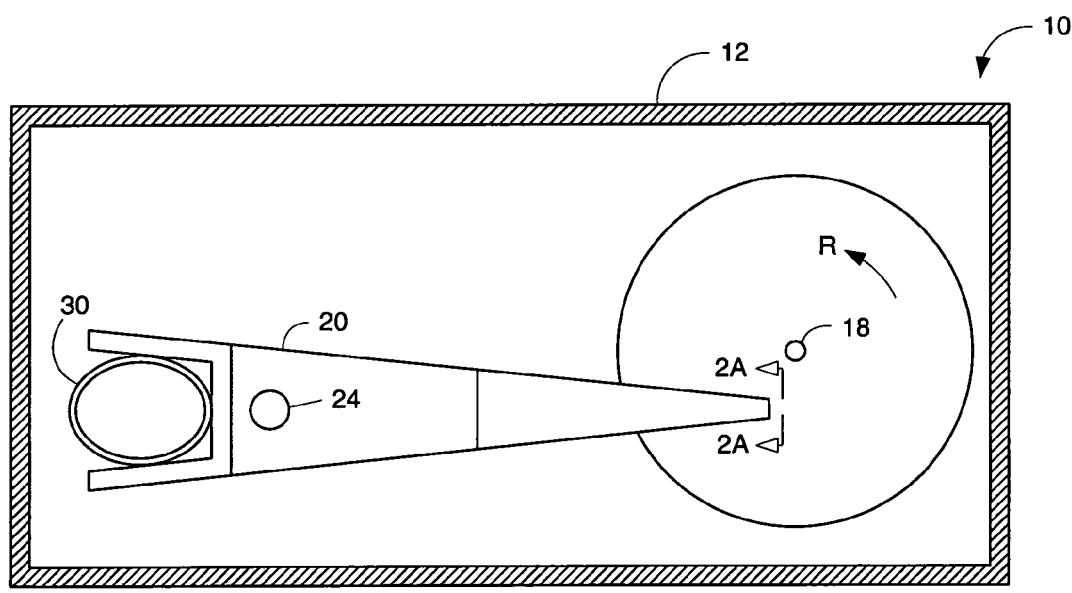
FIG. 1B is a top plan view taken along line 1B—1B of FIG. 1A.
Figure 2A:
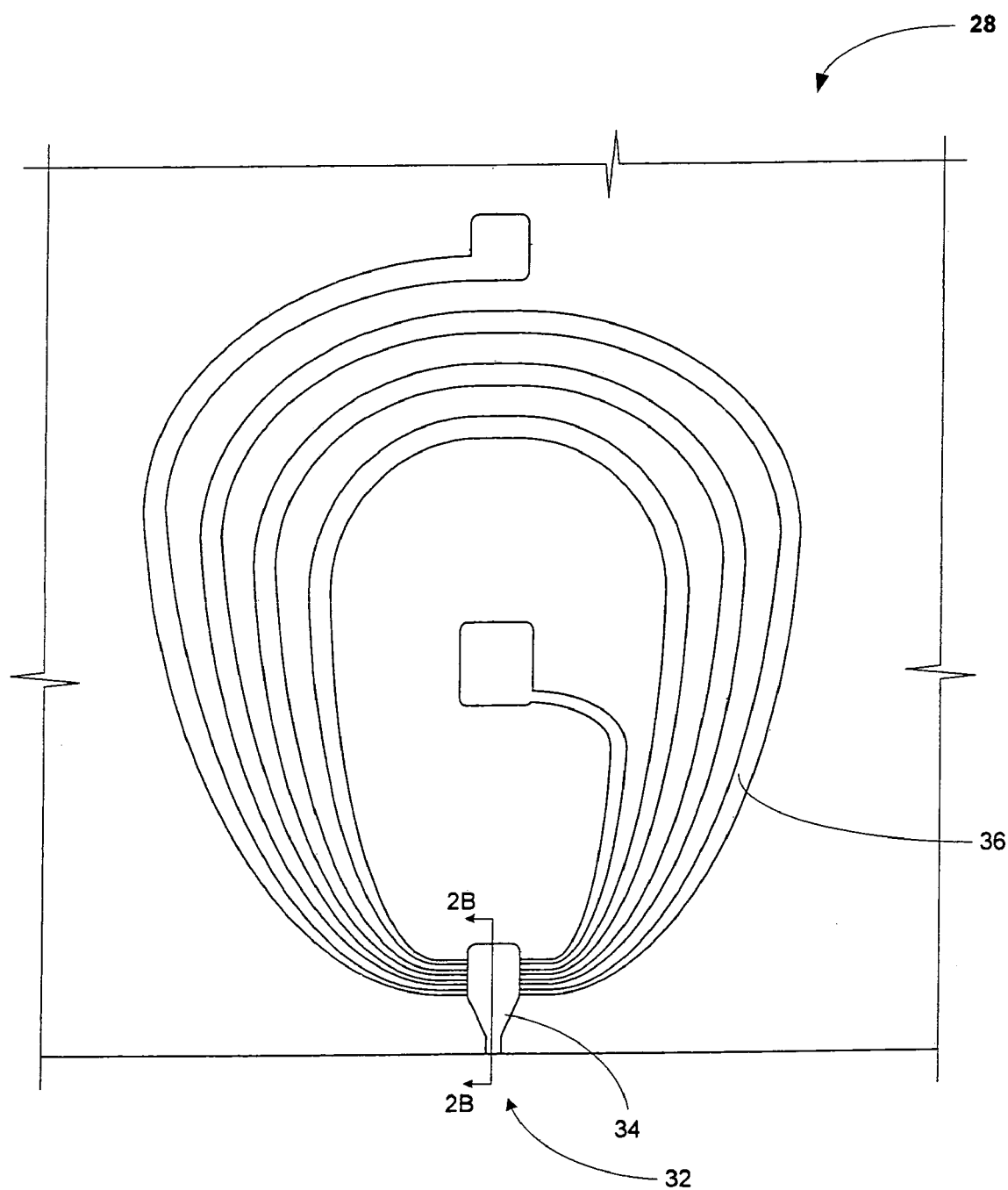
FIG. 2A is a is a view taken from line 2A—2A of FIG. 1B, shown greatly enlarged and rotated 180 degrees.
Figure 2B:
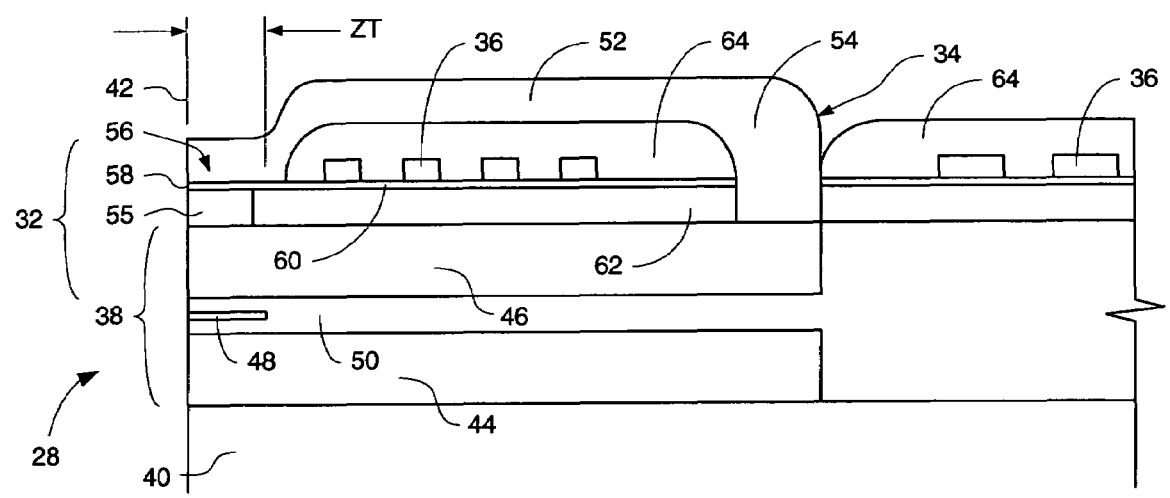
FIG. 2B is a view taken from line 2B—2B of FIG. 2A, shown enlarged.
Figure 3:
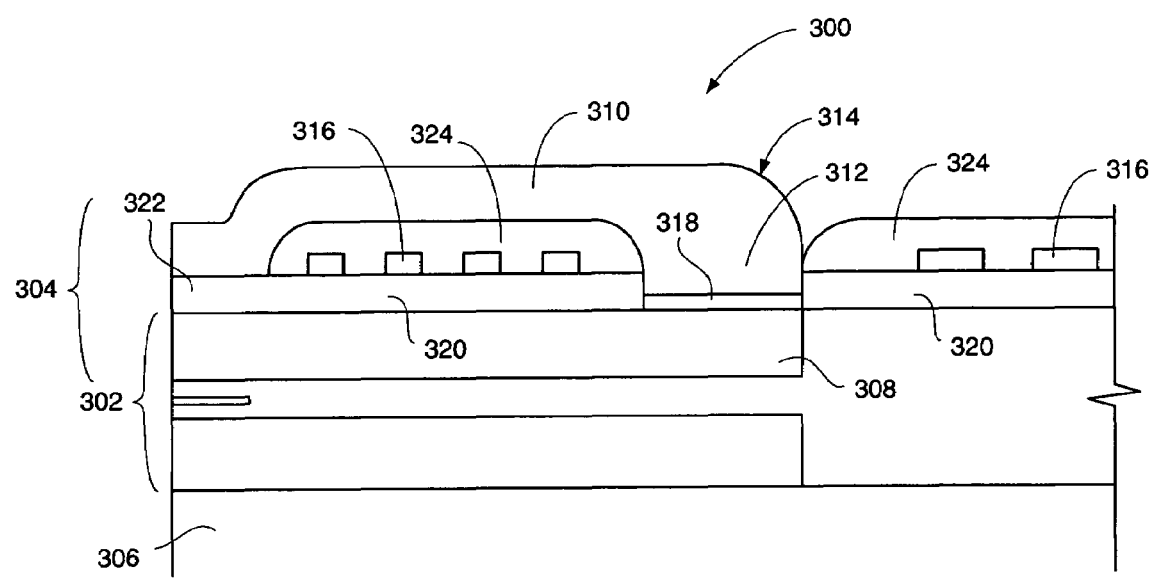
FIG. 3 is a cross sectional view, similar to FIG. 2B, of a head embodying the present invention.

With reference to FIG. 3, the present invention is embodied in a merged read write head generally referred to as 300, including a read element 302 and write element 304, both of which are built upon a substrate 306 preferably constructed of ceramic. The read element 302 having been described with reference to the Background of the Invention, this Detailed Description will focus on the write element 304, which embodies the present invention. The write head includes a first pole 308 and a second pole 310, which meet at a back gap 312 to form a yoke 314. A coil 316 passes through the yoke 314 to induce a magnetic flux therein as previously discussed with reference to the Background of the Invention.

The first pole 308 is preferably constructed of a high magnetic moment (high $B_{sat}$) material, such as for example $NiFe_{55}$, RhFeN and has a smooth upper surface generated by a chemical mechanical polishing process. A capping layer 318 constructed of relatively lower $B_{sat}$ material covers the first pole 308 in the region of the back gap 312. The capping layer 318 is preferably constructed of permalloy, which is an alloy of Ni and Fe having an Fe content of 18%–20%. Permalloy has a corrosion resistance that is significantly better than that of the currently available high $B_{sat}$ materials such as are used to form of the first pole 308. The capping layer 318 is preferably 1000–3000 Angstroms thick, and is more preferably about 1000 Angstroms thick. Preferably the capping layer is not greater than 1 um thick. Experimentation has shown that a layer of permalloy of the thickness disclosed has a negligible effect on magnetic performance of the head 300.

The present invention also contemplates the use of such a relatively low $B_{sat}$ material to prevent corrosion of a high $B_{sat}$ material in other locations. By way of example, and not limitation, the second pole could be primarily constructed of a high $B_{sat}$ material, with a thin layer of a relatively low $B_{sat}$ material covering the second poles as a capping layer to prevent corrosion.

With continued reference to FIG. 3, a write gap material layer 320, constructed of a dielectric material covers the first pole 308, exclusive of the back gap 312, and extends to the tip of the first pole 308 opposite the back gap 312. The write gap material layer is preferably constructed of $Al_2O_3$, or alternatively of $SiO_2$. The write gap material layer defines a write gap 322, by providing separation between the first and second poles 308, 310 at the tip of the yoke 314 or "yoke tip" region.

With reference still to FIG. 3, the coil 316 is formed on top of the write gap material layer 320. The coil 316 is preferably constructed of copper, and is formed by a process including photolithography and electro-plating as will be familiar to those skilled in the art. A second insulation layer, or "coil insulation layer" 324 is formed over the coil 316. The second insulation layer 324 has smoothly tapered edges formed by a curing process that will be described in greater detail below.

The second pole 310 is formed over the second insulation layer 324. The second pole 310 assumes the smoothly sloping contour of the edges of the second insulation layer. The second pole 310 contacts the thin capping layer 318 to magnetically couple with the first pole 308.

Figure 4:
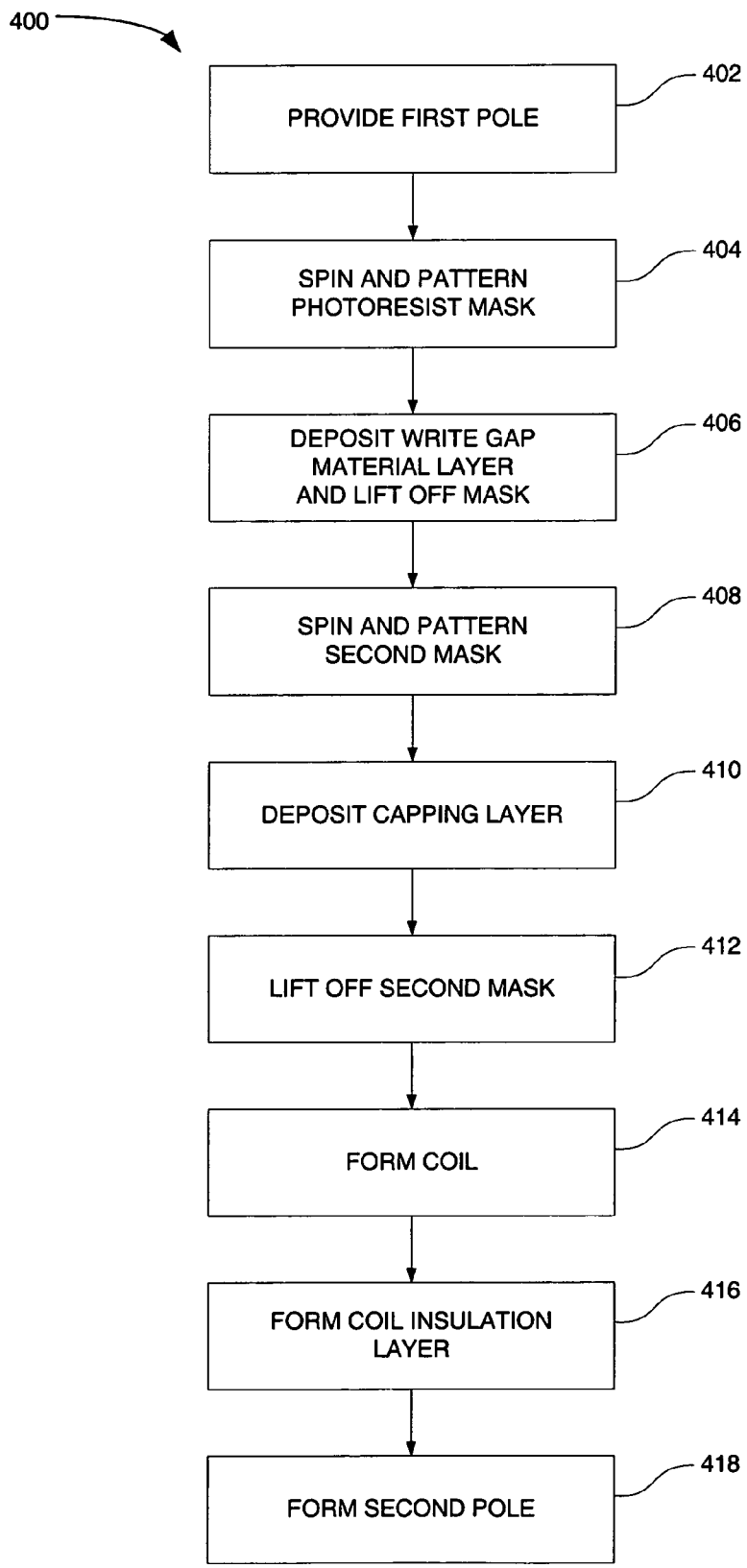
FIG. 4 is a flowchart illustrating a method for carrying out the present invention.

With reference to FIG. 4, a method 400 for constructing a merged read/write head 300 (FIG. 3) embodying the present invention is described. The read element 302 having already been constructed according to methods familiar with those skilled in the art, the method 400 begins with a step 402 of providing a first magnetic pole 308. The first pole 308 can also act as a second shield of the read element. The first pole 308 is preferably constructed of NiFe$_{55}$ deposited by electroplating. Alternatively, the first pole 308 can be constructed of other high B$_{sat}$ materials such as RhFeN, many of which can be deposited by a sputtering process familiar to those skilled in the art.

With continued reference to FIG. 4, in a step 404 a photoresist mask is spun onto the first pole 308 and patterned. Then, in a step 406 the write gap material layer is deposited and the photoresist is lifted off to expose the back gap portion 312 of the first pole 308 as well as probing pads (not shown) for the read element 302. Then, in a step 408 another layer of photoresist is spun and patterned as a mask to reveal the back gap of the first pole 308. In a step 410, the thin capping layer 318 is deposited onto the back gap 312 of the first pole 308. The capping layer is preferably permalloy having 18% Fe and is preferably deposited by sputtering. Then in a step 412 the second mask is lifted off leaving the back gap 312 capped with permalloy.

With reference still to FIG. 4, in a step 414 the coil 316 is formed. The coil is preferably formed of copper by a process that includes depositing a copper seed layer, aligning a mask, plating the copper coil and removing the mask. Then, in a step 416 the coil insulation layer 324 is formed. Forming the coil insulation layer includes spinning on photoresist, patterning the photoresist by a photolithographic technique, followed by a high temperature cure. The high temperature cure causes the coil insulation layer 324 to form smoothly sloped edges. Thereafter, in a step 418 the second pole is formed. The second pole is preferably formed of a high B$_{sat}$ material deposited by electroplating. Alternatively, the second pole 310 can also be sputter deposited when formed of a high B$_{sat}$ material not suitable for plating.

Figure 5:
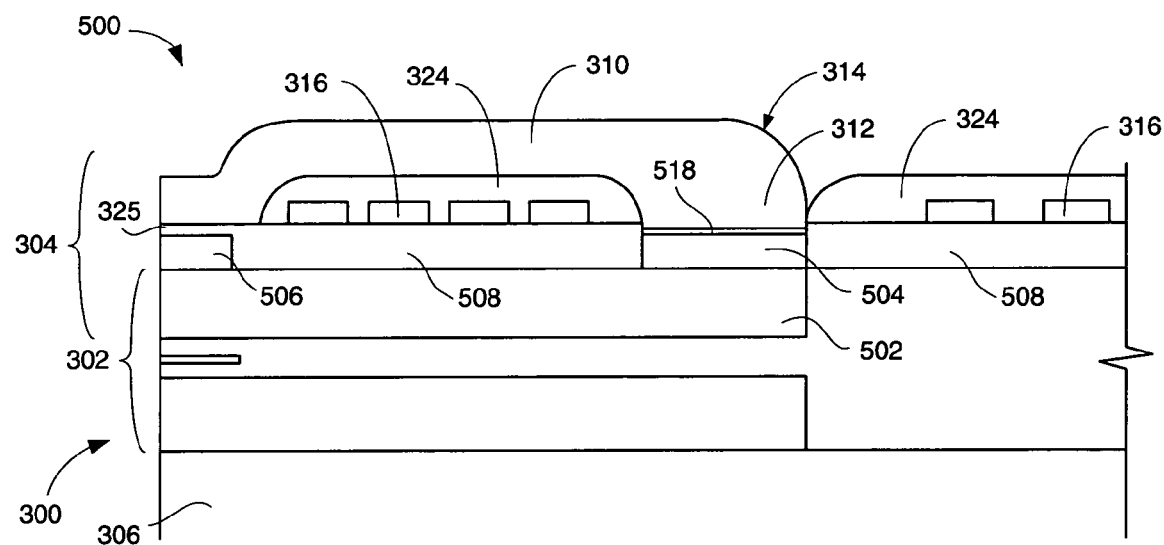
FIG. 5 is a cross sectional view, similar to FIGS. 3 and 2B, of an alternate embodiment of the present invention.

With reference now to FIG. 5, an alternate embodiment of the invention 500 includes a first pole 502 having a pedestal 504 at the back gap region 312 and another opposite pedestal 506 located in the area of the write gap 325. A layer of insulation 508 rises from the upper surface of the first pole 502 to a level above top of the write gap pedestal 506. The insulation layer 508 serves as a write gap layer as well as insulating the coil 316 from the first pole. The pedestals 504, 506 are preferably constructed of a high B$_{sat}$ material layer such as NiFe$_{55}$, while the remainder of the first pole 502 can be constructed of a material having soft magnetic properties such as permalloy. The pedestals are preferably formed after performing a chemical mechanical polishing process to planarize the upper surface of the first pole 502. A low B$_{sat}$ capping layer 518 covers the back gap pedestal 504 and is constructed of a material such as permalloy having a relatively high resistance to corrosion.

In still another embodiment of the invention (not shown) the first pole includes a first layer constructed of a soft magnetic material such as permalloy. That first layer is covered with a layer of a high B$_{sat}$ material such as NiFe$_{55}$. A layer of permalloy or some other suitable relatively corrosion resistant material covers the back gap area of the high B$_{sat}$ layer of the first pole in a manner similar to that described with reference to the first described embodiments.

Those skilled in the art will appreciate that as areal density requirements lead to ever smaller yoke lengths, back gap dimensions will correspondingly be reduced. At some point the use of high magnetic moment materials in the first pole will become an absolute necessity. In order to maintain acceptable data recording performance, a fringing gap field of at least 10,000 Oe must be maintained. Modeling has shown that, while a write head having a back-gap area of 72 um$^2$, can achieve a fringing gap field of 10747.2 Oe using Permalloy in the first pole, that same write element reduced in size to have a 32 um$^2$ back gap will have a fringing field of only 9015.3 Oe, which is not acceptable. On the other hand, a write element having a back gap of 32 um$^2$, that has a first pole constructed of Ni$_{45}$Fe$_{55}$ can maintain a fringing field of 10651.9 Oe. Adding a 0.1 um thick capping layer of Permalloy on top of this high magnetic moment material in the back gap has a negligible effect on performance, reducing the fringing field to 10648.9 Oe.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. An inductive write element for use in a magnetic data storage system, comprising:
   a. a substrate
   b. a lower magnetic pole, constructed at least partially of a high magnetic moment material, having first and second opposite ends;
   c. an upper magnetic pole, having first and second ends said first end of said lower pole being separated from said first end of said second upper pole by a write gap, and said second end of said first lower pole being electrically connected with said second end of said upper pole, said lower and upper poles together defining a magnetic yoke having a yoke tip portion defined by said first ends of said poles and having a back gap portion defined by said second ends of said poles, said lower pole being situated more closely than said upper pole to said substrate;
   d. an electrically conductive coil, a portion of which passes through said yoke between said first lower and upper poles between said yoke tip and said back gap;
   e. an electrical insulator, electrically isolating said coil from said yoke; and
   f. a thin layer of material having a magnetic moment lower than that of said high magnetic moment material of said first lower magnetic pole disposed between said lower and upper poles at said back gap of said yoke and electrically connecting said lower and upper poles.

2. An inductive write element as recited in claim 1 wherein said second upper pole is constructed at least partially of a high magnetic moment material.

3. An inductive write element as recited in claim 1 wherein said material having a magnetic moment lower than that of said high magnetic moment material of said lower magnetic pole is permalloy.

4. An inductive write element as recited in claim 1 further comprising a layer of write gap material disposed between said lower and upper poles in said write gap.

5. An inductive write element as recited in claim 1 wherein said layer between said lower and upper poles at said back gap is between 1000 and 3000 Angstroms thick.

6. An inductive write element as recited in claim 1 wherein said layer between said lower and upper poles at said back gap is roughly 1000 Angstroms thick.

7. A method for constructing an inductive write element for use in a magnetic data storage system, comprising the steps of:
   a. forming a first pole, constructed at least partially of a high magnetic moment material, said first pole having a back gap portion and an opposite write gap portion;
   b. depositing a first layer of dielectric material onto said first pole, leaving said back gap portion uncovered;
   c. masking said dielectric material using a photolithographic process to leave said back gap of said first pole exposed;
   d. plating a material having a magnetic moment lower than that said high magnetic moment material of said first magnetic pole onto said masked surface;
   e. removing said mask, leaving said back gap plated with said material having a magnetic moment lower than that of said high magnetic moment material of said first magnetic pole;
   f. forming an electrically conductive coil having a plurality of winds a portion of which pass over said first pole between said pole tip and said back gap;
   g. depositing a second layer of dielectric material leaving said back gap uncovered;
   h. forming a second pole, constructed of a magnetic material, onto said second insulation layer and over said first pole and contacting said first pole in said back gap.

8. A method as recited in claim 7 wherein said second pole is constructed at least partially of a high magnetic moment material.

9. A method as recited in claim 7 wherein said material having a magnetic moment lower than that of said high magnetic moment material of said first magnetic pole deposited onto said back gap is permalloy.

10. A method as recited in claim 7 wherein said material having a magnetic moment lower than that of said high magnetic moment material of said first magnetic pole comprises a layer between 1000 and 3000 Angstroms thick.

11. A method as recited in claim 7 wherein said material having a magnetic moment lower than that of said high magnetic moment material of said first magnetic pole comprises a layer roughly 1000 Angstroms thick.

12. A method as recited in claim 7 further comprising the step of depositing a layer of write gap material onto said first dielectric layer, leaving said back gap exposed.

13. A method as recited in claim 7 wherein said first layer of dielectric material provides a write gap material layer to separate said first and second poles from one another in said pole tip region opposite said back gap.

14. A method as recited in claim 7 wherein said first pole exclusive of said material having a magnetic moment lower than that of said high magnetic moment material of said first magnetic pole is constructed of a Ni—Fe alloy having roughly 55% Fe.

15. A method as recited in claim 7 wherein said second pole is constructed or a Ni—Fe alloy having 55% Fe.

16. A method as recited in claim 7 wherein said step of depositing a first dielectric layer onto said first pole further includes the steps of:
   a. spinning on a photoresist;
   b. masking the photoresist; and
   c. selectively lifting off said photoresist to uncover said back gap.

17. An inductive write element for use in a magnetic data storage system, comprising:
   a. a substrate
   b. a magnetic yoke primarily constructed of a high magnetic moment material, said magnetic yoke including lower and upper poles separated from one another at a first end of said yoke and joined to one another at a second end of said yoke said yoke defining an open interior between said lower and upper poles between said first and second ends, said lower pole being situated more closely than said upper pole to said substrate;
   c. an electrically conductive coil, passing through said open interior of said magnetic yoke and being electrically isolated said magnetic yoke;
   d. a layer of dielectric material separating said lower and upper poles from one another at said first end; and wherein
   e. said yoke includes a thin layer of material having a magnetic moment lower than that of said high magnetic moment material of said first lower magnetic pole.

18. An inductive write element as recited in clam 17 wherein said thin layer is between 1000 and 3000 Angstroms thick.

* * * * *

UNITED STATES PATENT AND TRADEMARK OFFICE
CERTIFICATE OF CORRECTION

| | | |
|---|---|---|
| PATENT NO. | : 6,989,962 B1 | |
| APPLICATION NO. | : 10/373564 | |
| DATED | : January 24, 2006 | |
| INVENTOR(S) | : Zi-Wen Dong et al. | |

It is certified that error appears in the above-identified patent and that said Letters Patent is hereby corrected as shown below:

On the Title Page, line (75) Inventors:

Please delete "James Wong, Milpitas, CA (US)" and replace therefore with -- James Wang, Milpitas, CA (US) --.

Signed and Sealed this

Fifteenth Day of August, 2006

JON W. DUDAS
*Director of the United States Patent and Trademark Office*